(12) United States Patent
Ren et al.

(10) Patent No.: US 10,365,976 B2
(45) Date of Patent: Jul. 30, 2019

(54) SCHEDULING AND MANAGING SERIES OF SNAPSHOTS (71) Applicant: VMware, Inc., Palo Alto, CA (US)

(72) Inventors: Joanne Ren, Palo Alto, CA (US); Keith Farkas, Palo Alto, CA (US); Mike Zucca, Palo Alto, CA (US); Martin Marinov, Sofia (BG); Martin Valkanov, Sofia (BG); Biliana Petrova, Sofia (BG)

(73) Assignee: VMware, Inc., Palo Alto, CA (US)

( * ) Notice: Subject to any disclaimer, the term of this patent is extended or adjusted under 35 U.S.C. 154(b) by 420 days.

(21) Appl. No.: 15/197,352

(22) Filed: Jun. 29, 2016

(65) Prior Publication Data
US 2017/0031776 A1 Feb. 2, 2017

Related U.S. Application Data

(60) Provisional application No. 62/197,807, filed on Jul. 28, 2015.

(51) Int. Cl.
*G06F 11/14* (2006.01)

(52) U.S. Cl.
CPC ...... *G06F 11/1461* (2013.01); *G06F 11/1451* (2013.01); *G06F 11/1469* (2013.01); *G06F 2201/805* (2013.01); *G06F 2201/815* (2013.01); *G06F 2201/84* (2013.01)

(58) Field of Classification Search
CPC ............. G06F 11/1461; G06F 11/1451; G06F 11/1469; G06F 2201/805; G06F 2201/815; G06F 2201/84
See application file for complete search history.

(56) References Cited

U.S. PATENT DOCUMENTS

| 6,694,413 B1* | 2/2004 | Mimatsu ............ G06F 11/1466 707/999.202 |
| 7,085,901 B2* | 8/2006 | Homma .............. G06F 11/1466 707/999.202 |
| 7,093,086 B1 | 8/2006 | Van Rietschot |
| 8,117,168 B1 | 2/2012 | Stringham |

(Continued)

OTHER PUBLICATIONS

Wood, et al., "Disaster Recovery as a Cloud Service: Economic Benefits & Deployment Challenges" Jun. 22, 2010 (7 pgs).

*Primary Examiner* — Uyen T Le
(74) *Attorney, Agent, or Firm* — Fish & Richardson P.C.

(57) ABSTRACT

The present disclosure is related to systems and methods for scheduling and managing series of snapshots. An example method can include estimating a transfer time to transfer a first snapshot of a virtual computing instance (VCI) to a first snapshot series, and estimating a transfer time to transfer a second snapshot of the VCI to a second snapshot series. The method can further include determining a first schedule time to start a transfer of a first series of snapshots and determining a second schedule time to start a transfer of a second series of snapshots, wherein the first schedule time and the second schedule time are based at least in part on a respective recovery point objective (RPO). In some embodiments, the method can further include scheduling a point in time to record a next snapshot based at least in part on the shorter schedule time of the first schedule time and the second schedule time.

22 Claims, 9 Drawing Sheets

(56) References Cited

U.S. PATENT DOCUMENTS

| | | | |
|---|---|---|---|
| 2011/0010515 A1* | 1/2011 | Ranade | G06F 11/1451 711/162 |
| 2014/0365740 A1* | 12/2014 | Vasilyev | G06F 11/1451 711/162 |
| 2016/0041996 A1* | 2/2016 | Prinz, III | G06F 17/30079 707/827 |

* cited by examiner

SCHEDULING AND MANAGING SERIES OF SNAPSHOTS

PRIORITY INFORMATION

This application claims the benefit of U.S. Provisional Application 62/197,807, filed Jul. 28, 2015.

BACKGROUND

Virtual computing instances (VCIs), such as virtual machines, virtual disks, virtual workloads, data compute nodes, clusters, and containers, among others, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. VCIs can be deployed on a hypervisor provisioned with a pool of computing resources (e.g., processing resources, memory resources, etc.). There are currently a number of different configuration profiles for hypervisors on which VCIs may be deployed.

DETAILED DESCRIPTION

The term "virtual computing instance" (VCI) covers a range of computing functionality. VCIs may include non-virtualized physical hosts, virtual machines (VMs), virtual disks, and/or containers. Containers can run on a host operating system without a hypervisor or separate operating system, such as a container that runs within Linux. A container can be provided by a virtual machine that includes a container virtualization layer (e.g., Docker). A VM refers generally to an isolated user space instance, which can be executed within a virtualized environment. Other technologies aside from hardware virtualization can provide isolated user space instances, also referred to as VCIs. The term "VCI" covers these examples and combinations of different types of VCIs, among others.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

As software defined data centers become increasingly popular and widespread, it can become beneficial to limit an amount of data that can be lost in the event of a VCI failure. This is relevant to both service providers and customers, for example, for customers who consume virtual computing services. Advantageously, embodiments described herein can allow for scheduling and management of series of snapshots to limit an amount of data that can be lost if a VCI fails.

Embodiments of the present disclosure are directed to configuration and/or management of series of snapshots of a VCI or VCIs. As used herein, a "snapshot" is a file that includes information regarding a VCI. For example, a snapshot can include metadata (e.g., config files, nvram files, etc.) regarding a VCI. In some embodiments, a snapshot can include persisted state changes to a VCI that have occurred since a previous (e.g., last) snapshot was taken, for example, a snapshot can include information associated with incremental changes to a VCI since a previous snapshot was taken. Advantageously, a snapshot can include secondary copies of a state of a VCI. Snapshots can be taken periodically and can be copied and/or stored, as described in more detail herein.

A snapshot can have a particular point in time (PIT) associated therewith. In some embodiments, the PIT can be a time that the snapshot was taken. A plurality of snapshots can be taken at different points in time and can be stored in a particular order to form a snapshot series. In some embodiments, a snapshot series can include a plurality of sequentially (e.g., chronologically ordered) captured snapshots. Embodiments are not limited to storing snapshots in a particular order; however, and a snapshot or snapshots can be copied or otherwise moved from one snapshot series to another snapshot series. Herein, "snapshot series" and "series of snapshots" are used interchangeably.

Two or more series of snapshots can be organized in various ways. For example, two or more series of snapshots can be organized in a cascade relationship or a fan-out relationship. In a cascade relationship, a snapshot of a VCI can be taken, copied into a first series of snapshots, and then copied into a second series of snapshots. In contrast, a fan-out relationship can be achieved by taking a snapshot of a VCI and copying the snapshot into both the first series of snapshots and the second series of snapshots concurrently. In some embodiments, a recovery point objective, as described in more detail herein, can be used to govern copying of snapshots into the various series.

In some embodiments, information contained in one or more snapshots can be used to recover a persisted state of a VCI at a given PIT. That is, a VCI can be recovered at a given PIT by copying information associated with a snapshot with a particular PIT, or by combining information associated with two or more snapshots corresponding to the VCI. In some embodiments, an amount of data that can be lost in the event of a VCI failure can be bounded or limited by managing and scheduling series of snapshots.

In some embodiments, bounding or limiting an amount of data lost in the event of a VCI failure can be facilitated via a recovery point objective (RPO). As used herein, a "recovery point objective" specifies an amount of time (e.g., a time skew) between a primary and a secondary snapshot associated with a VCI. In some embodiments, the RPO can be specified by a user. For example, for a time skew of one minute, the data associated with a secondary snapshot should never be more than one minute out of date with respect to the data associated with a primary snapshot. To this end, a snapshot can be taken early enough that an amount of time required to perform the snapshot and copy operation is less than the RPO, as described in more detail herein.

As an example, if it takes 10 minutes to take and copy a snapshot from a first storage location to a second storage location, and the specified RPO is 30 minutes, the following schedule could used:

12:00 pm: Take a first snapshot at a first (e.g., primary) location and begin copying the first snapshot to a second (e.g., secondary) location.

12:10 pm: The copy operation initiated at 12:00 pm completes. The copy of the first snapshot at the second location is 10 minutes old.

12:20 pm: Take a second snapshot at the first location and begin copying the second snapshot to the second location.

12:30 pm: The copy operation initiated at 12:20 pm completes. The copy of the first snapshot at the second location is 30 minutes old.

12:40 pm: Take a third snapshot at the first location and begin copying the third snapshot to the second location.

12:50 pm: The copy operation initiated at 12:40 pm completes. The copy of the second snapshot at the second location is 30 minutes old.

In some embodiments, a VCI can have more than one snapshot series associated therewith. In embodiments including more than one snapshot series associated with a VCI, a given PIT can be associated with more than one snapshot; however, each respective snapshot can be associated with a single, respective PIT, as illustrated in Table 1, herein.

TABLE 1

| PIT | First Snapshot Series (RPO = 5 minutes) | Second Snapshot Series (RPO = 10 minutes) |
|---|---|---|
| 0 | Base First Series | Base Second Series |
| 1 | Snapshot 1.1 | |
| 2 | Snapshot 1.2 | Snapshot 2.1 |
| 3 | Snapshot 1.3 | |
| 4 | Snapshot 1.4 | Snapshot 2.2 |
| ... | ... | ... |

The example of Table 1 illustrates a relationship between a first snapshot series with an associated RPO of 5 minutes and a second snapshot series with an associated RPO of 10 minutes at various points in time. In this example, each increment of the PIT corresponds to 5 minutes. At a PIT "0," the first snapshot series and the second snapshot series can include previously stored snapshot series. PIT "1" can be associated with snapshot 1.1. PIT "2" can be associated with both snapshot 1.2 and snapshot 2.1, however. That is, a VCI image created using either snapshot 1.2 or snapshot 2.1 will be the same. Similarly, in the example illustrated in Table 1, PIT "3" can be associated with snapshot 1.3, and PIT "4" can be associated with both snapshot 1.4 and snapshot 2.2.

Figure 1A:
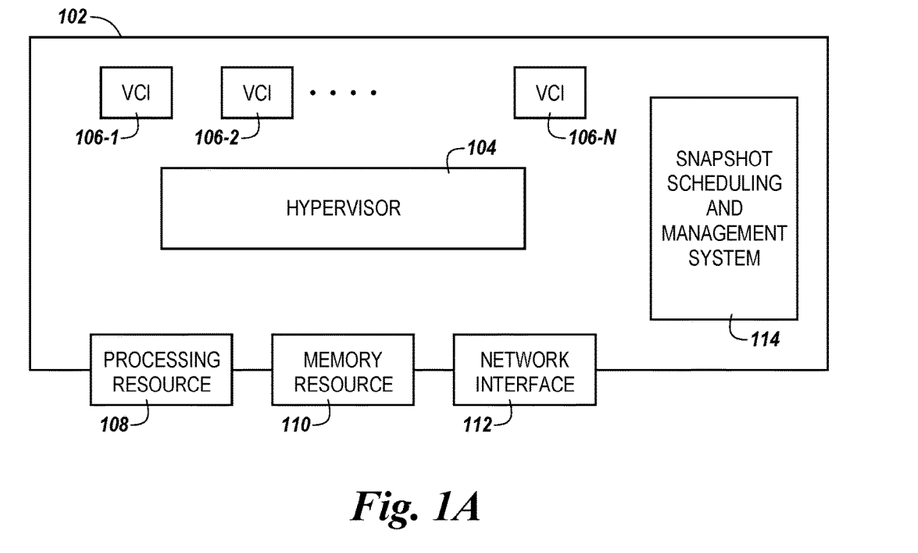
FIG. 1A is a diagram of a host for scheduling and managing series of snapshots according to a number of embodiments of the present disclosure.

FIG. 1a is a diagram of a host for scheduling and managing series of snapshots according to a number of embodiments of the present disclosure. The system can include a host 102 with processing resources 108 (e.g., a number of processors), memory resources 110, and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of VCIs 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs can be local and/or remote to the host 102. For example, in a software defined data center, the VCIs 106 can be provisioned with resources that are generally available to the software defined data center and not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106. The host 102 can be in communication with a snapshot scheduling and management system 114. In some embodiments, the snapshot scheduling and managing system can include a combination of software and hardware, or the snapshot scheduling and management system 114 can include software and can be provisioned by processing resource 108. An example of the snapshot scheduling and managing system is illustrated and described in more detail with respect to FIG. 2.

Figure 1B:
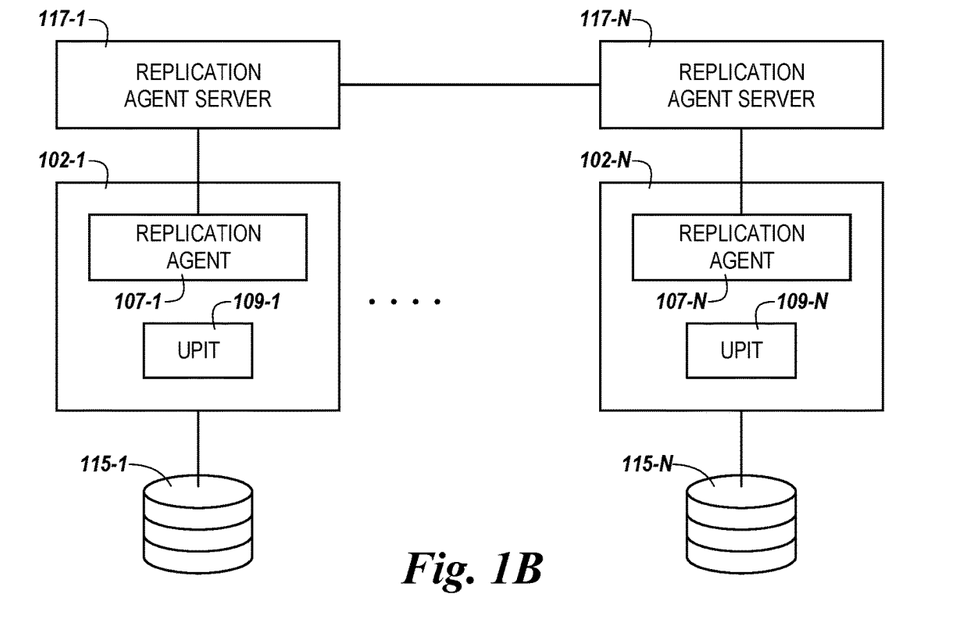
FIG. 1B is a diagram of a plurality of hosts for scheduling and managing series of snapshots according to a number of embodiments of the present disclosure.

FIG. 1B is a diagram of a plurality of hosts for scheduling and managing series of snapshots according to a number of embodiments of the present disclosure. A first host 102-1 can include a replication agent 107-1 and/or a point in time agent "UPIT" 109-1, and can be in communication with a data store 115-1. In some embodiments, the replication agent 107-1 can be in communication with a replication agent server 117-1. Similarly, a second host 102-N can include a replication agent 107-N and/or a point in time agent "UPIT" 109-N, and can be in communication with a data store 115-N. In some embodiments, the UPIT 109-1, 109-N can associate a PIT with one or more snapshots.

In some embodiments, the replication agent 107-N can be in communication with a replication agent server 117-N. The respective replication agents 107-1, 107-N and the respective replication agent servers 117-1, 117-N can collectively function analogously to the snapshot scheduling and management system 114, illustrated in FIG. 1A, for example. In this regard, scheduling and managing series of snapshots can be provided by one or more respective replication agents 107-1, 107-N and/or one or more replication agent servers 117-1, 117-N. In some embodiments, each respective replication agent 107-1, 107-N and/or each respective replication agent server 117-1, 117-N can be associated with a respective host 102-1, 102-N. That is, in some embodiments, a separate system for scheduling and managing series of snapshots (e.g., replication agent 107-1 and replication agent server 117-1, and replication agent 107-N and replication agent server 117-N) can be deployed on each respective host 102-1, 102-N. In some embodiments, the replication agent servers 117-1, 117-N can be in communication with, and/or connected to, each other directly or via one or more additional systems. In this regard, each respective replication agent 107-1, 107-N and each respective replication agent server 117-1, 117-N can facilitate scheduling and managing of snapshot across a plurality of sites, for example across primary site 121 and secondary site 123, discussed in connection with FIG. 1C, herein.

Figure 1C:
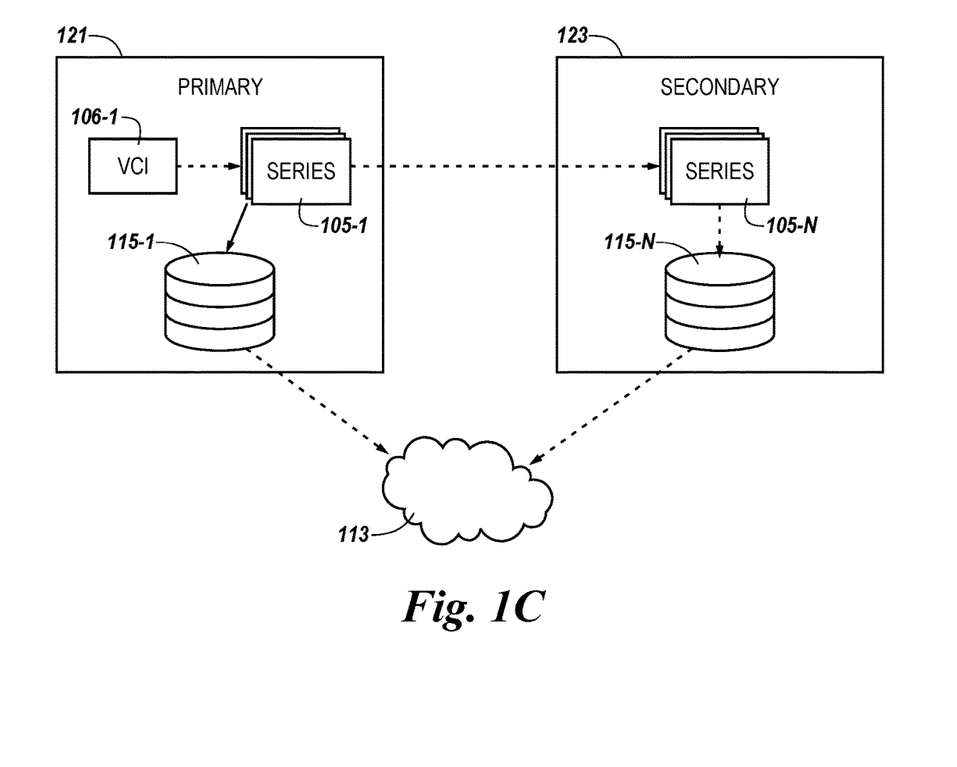
FIG. 1C is a diagram of an example topology for scheduling and managing series of snapshots according to the present disclosure.

FIG. 1C is a diagram of an example topology for scheduling and managing series of snapshots according to the present disclosure. In some embodiments, a VCI 106-1 can be located at a primary site 121. A snapshot can be taken of a first VCI 106-1. The snapshot can be copied to a first snapshot series 105-1. In some embodiments, the snapshot can be copied to a second snapshot series 105-2 located at a secondary site 123. In at least one embodiment, the snapshot and/or snapshot series can be copied to a data store 115-1 associated with the primary site 121. In some embodiments, the second snapshot series 105-N can be copied to a data store 115-N associated with the secondary site 123. In some embodiments, the first snapshot series 105-1 and/or the second snapshot series 105-N can be copied to a remote storage location 113 from a respective data store 115-1, 115-N. In this regard, series of snapshots can be scheduled and managed, as described in more detail herein. In some embodiments, remote storage location 113 can be a cloud storage location, a blob store, etc. In some embodiments, a blob store can be configured as an agent that can store metadata associated with snapshots and/or series of snapshots. Embodiments are not so limited; however, and an agent that manages a series stored in remote storage location 113 can be collocated with a source for a respective series. For example, an agent that manages a series stored in remote storage location 113 can be collocated with replication agent 107-1. In some embodiments, a blob store can store semantic metadata associated with a VCI in order to map information in the blob store to the VCI and vice versa.

For example, a snapshot of VCI 106-1, located at the primary site 121 can be taken. In some embodiments, the snapshot can be copied into the first snapshot series 105-1 and then copied into the second series 105-N. In this example, the first snapshot series 105-1 and the second snapshot series 105-N can be organized in a cascade relationship. In some embodiments, the RPO can be used to govern the copying of the two snapshot series 105-1, 105-N. That is, the two snapshot series 105-1, 105-N can be cascaded such that the RPO is maintained. In some embodiments, additional back-up and/or redundancy can be provided to at least one of the snapshot series 105-1, 105-N by copying at least one of the snapshot series 105-1, 105-N into a respective data store 115-1, 115-N. In some embodiments, the copying to series 113 can occur from series 105-1 independently of the copying to series 105-N, thus implementing a fan-out from series 105-1. Each of the copy operations, in some embodiments, can be driven by RPO or other policies, such as copying every N snapshot to a given target, where N is a whole number.

In some embodiments, the RPO can be specified for at least one of the snapshot series 105-1, 105-N. For example, a RPO of 15 minutes can be specified for the second snapshot series 105-N. This RPO can be relative either to the first snapshot series 105-1 or to the state of VCI 106-1, such as stored on a data store 115-1. In embodiments, the snapshot scheduling and management system (e.g., snapshot scheduling and management system 114 illustrated in FIG. 1A) or a replication agent and/or a replication agent server (e.g., replication agent 107-1 and/or replication agent server 117-1, illustrated in FIG. 1B) can ensure that snapshot copies are not older than the RPO value with respect to the first snapshot series 105-1 or with the state of VCI 106-1.

Figure 2:
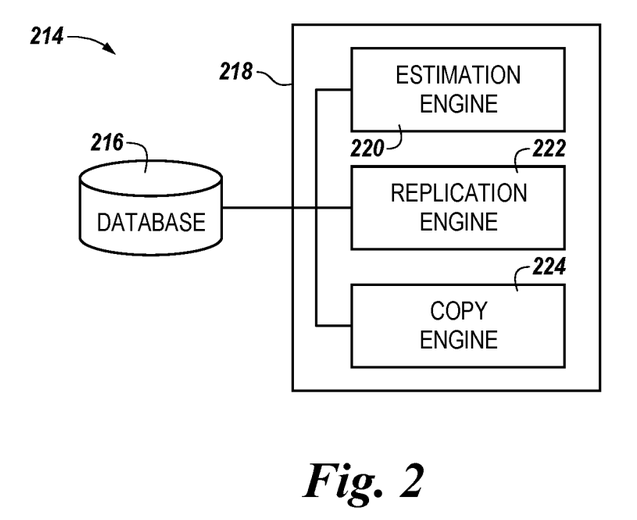
FIG. 2 is a diagram of a system for scheduling and managing series of snapshots according to a number of embodiments of the present disclosure.

FIG. 2 is a diagram of a system for scheduling and managing series of snapshots according to a number of embodiments of the present disclosure. The system 214 can include a database 216, a subsystem 218, and/or a number of engines, for example estimation engine 220, replication engine 222, and/or copy engine 224, and can be in communication with the database 216 via a communication link. The system 214 can include additional or fewer engines than illustrated to perform the various functions described herein. The system can represent program instructions and/or hardware of a machine (e.g., machine 326 as referenced in FIG. 3, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the estimation engine 220 can include a combination of hardware and program instructions that can be configured to estimate a transfer time to copy a first snapshot of a virtual computing instance (VCI) into a snapshot series, estimate a transfer time to copy a second snapshot of the VCI into the snapshot series, and determine a minimum transfer time to copy the first snapshot or the second snapshot into the snapshot series based on the shorter transfer time of the first transfer time and the second transfer time.

In some embodiments, the replication engine 222 can include a combination of hardware and program instructions that can be configured to record at least one of the first snapshot and the second snapshot based on the determination of the minimum transfer time. The replication engine 222 can be configured to recover a state of the VCI based on at least one of the first snapshot and the second snapshot.

In some embodiments, the copy engine 224 can include a combination of hardware and program instructions that can be configured to copy at least one of the first snapshot and the second snapshot into the snapshot series. For example, the copy engine 224 can determine when to copy the first snapshot into a series of snapshots based on a determination that the first transfer time is shorter than the second transfer time. In some embodiments, the copy engine 224 can include a combination of hardware and program instructions that can be configured to copy only information that has changed between the first and second snapshots.

In some embodiments, the system 214 can include a replication schedule engine that can be configured to control copying at least one of the first snapshot and the second snapshot such that the copy occurs at a particular time. The replication schedule engine can be deployed on a host (e.g., host 102) on which the VCI (e.g., VCI 106-1) is running. In some embodiments, the VCI (e.g., VCI 106-1) can be configured to run on top of at least one of the first series of snapshots and the second series of snapshots.

Figure 3:
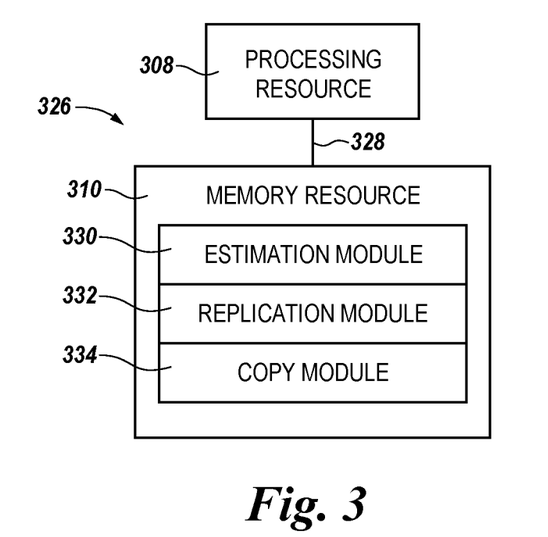
FIG. 3 is a diagram of a machine for scheduling and managing series of snapshots according to a number of embodiments of the present disclosure.

FIG. 3 is a diagram of a machine for scheduling and managing series of snapshots according to a number of embodiments of the present disclosure. The machine 326 can utilize software, hardware, firmware, and/or logic to perform a number of functions. The machine 326 can be a combination of hardware and program instructions configured to perform a number of functions (e.g., actions). The hardware, for example, can include a number of processing resources 308 and a number of memory resources 310, such as a machine-readable medium (MRM) or other memory resources 310. The memory resources 310 can be internal and/or external to the machine 326 (e.g., the machine 326 can include internal memory resources and have access to external memory resources). In some embodiments, the machine 326 can be a VCI. The program instructions (e.g., machine-readable instructions (MRI)) can include instructions stored on the MRM to implement a particular function (e.g., an action such as scheduling and managing series of snapshots). The set of MRI can be executable by one or more of the processing resources 308. The memory resources 310 can be coupled to the machine 326 in a wired and/or wireless manner. For example, the memory resources 310 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 310 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 308 can be coupled to the memory resources 310 via a communication path 328. The communication path 328 can be local or remote to the machine 326. Examples of a local communication path 328 can include an electronic bus internal to a machine, where the memory resources 310 are in communication with the processing resources 308 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 328 can be such that the memory resources 310 are remote from the processing resources 308, such as in a network connection between the memory resources 310 and the processing resources 308. That is, the communication path 328 can be a network connection. Examples of such a network connection can include a local area network (LAN), wide area network (WAN), personal area network (PAN), and the Internet, among others.

As shown in FIG. 3, the MRI stored in the memory resources 310 can be segmented into a number of modules 330, 332, 334 that when executed by the processing resources 308 can perform a number of functions. As used herein a module includes a set of instructions included to perform a particular task or action. The number of modules 330, 332, 334 can be sub-modules of other modules. For example, the replication module 332 can be a sub-module of the estimation module 330 and/or can be contained within a single module. Furthermore, the number of modules 330, 332, 334 can comprise individual modules separate and distinct from one another. Examples are not limited to the specific modules 330, 332, 334 illustrated in FIG. 3.

Each of the number of modules 330, 332, 334 can include program instructions and/or a combination of hardware and program instructions that, when executed by a processing resource 308, can function as a corresponding engine as described with respect to FIG. 2. For example, the estimation module 330 can include program instructions and/or a combination of hardware and program instructions that, when executed by a processing resource 308, can function as the estimation engine 220, the replication module 332 can include program instructions and/or a combination of hardware and program instructions that, when executed by a processing resource 308, can function as the replication engine 222, and/or the copy module 334 can include program instructions and/or a combination of hardware and program instructions that, when executed by a processing resource 308, can function as the copy engine 224.

For example, the machine 326 can include an estimation module 330, which can include instructions to estimate a transfer time to copy a first snapshot of a virtual computing instance (VCI) into a snapshot series, estimate a transfer time to copy a second snapshot of the VCI into the snapshot series, and determine a minimum transfer time to copy the first snapshot or the second snapshot into the snapshot series based on the shorter transfer time of the first transfer time and the second transfer time. In some embodiments, the replication module 332 can include instructions to record at least one of the first snapshot and the second snapshot based on the determination of the minimum transfer time.

The copy module 334 can include instructions to copy at least one of the first snapshot and the second snapshot into the snapshot series. For example, copy module 334 can include instructions to copy a first snapshot and a second snapshot into a snapshot series associated with the first snapshot and the second snapshot. In some embodiments, the copy module 334 can copy the second snapshot into a snapshot series in response to the second transfer time being shorter than the first transfer time. Embodiments are not so limited; however, and in at least one embodiment, the copy module 334 can copy the second into a snapshot series in response to a third transfer time being shorter than the first and/or second transfer times.

In some embodiments, a VCI can be replicated to a first series, which can further be replicated to a second series. In some embodiments, a reference point in time associated with the first series can be provided and copies of snapshots can be replicated such that a copy of a snapshot in the second series is never more out of date with respect to the first series than an RPO value. Embodiments are not so limited; however, and a reference point in time associated with the VCI can be provided such that a copy of a snapshot in the first series or the second series is never more out of date with respect to the VCI than a RPO value. In some embodiments, a respective RPO can be associated with a respective series such that the value of the RPO can be different for different series.

Figure 4:
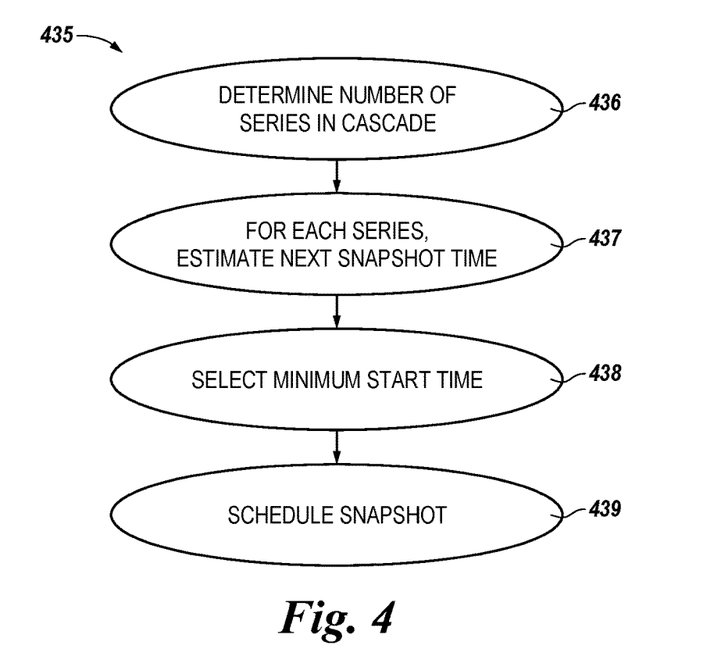
FIG. 4 is a flow chart illustrating a number of methods for scheduling and managing series of snapshots according to embodiments of the present disclosure.

FIG. 4 is a flow chart 435 illustrating a number of methods for scheduling and managing series of snapshots according to embodiments of the present disclosure. In some embodiments, a replication scheduler (e.g., replication engine 222, replication module 332, etc.) can determine when a next snapshot of a VCI or VCIs should be taken. In some embodiments, the snapshot taking process can occur in response to a previous copy operation of a snapshot completing. At 436, the replication scheduler can determine a number of series in a cascade. For each series, a time when the next snapshot can be taken can be estimated, for example at 437. In some embodiments, a transfer time, e.g., the amount of time it will take to capture a snapshot from a first series (e.g., a parent series) and to copy the snapshot into a first child series can be estimated. By estimating a time when the next snapshot can be taken, it can be possible to schedule and manage snapshots, and series of snapshots, such that a set of RPOs can be maintained. If the snapshot series graph includes a fan-out, the estimation is computed for each branch individually. For example, for a replication topology a first series cascades into a second and a third series, and the third series cascades into a forth series, the estimation can be done once for the branch first series—second series, and once for the branch first series—third series—fourth series.

At 438, the replication scheduler can select a minimum time to take the snapshot from the estimated times that the snapshot can be taken. This can ensure that a snapshot is taken at a PIT early enough that the snapshot can be copied downstream while still maintaining the RPO of each downstream series. For example, the minimum time to take the snapshot can correspond to a time to take that snapshot and copy that snapshot to one or more series of snapshots that is less than the RPO.

At 439, the replication scheduler can schedule a snapshot to be taken at the minimum time determined at block 438. The transfer time can be estimated based on an average amount of time taken for two or more preceding snapshots to be transferred, and/or can be based on a scaled average based on accumulated data. In some embodiments, the replication scheduler can run the host where the VCI is deployed. In some embodiments, a plurality of respective replication schedulers (e.g., replication agents 107-1, 107-N illustrated in FIG. 1B) can run on a respective host (e.g., host 102 in FIGS. 1A and 1B).

Figure 5:
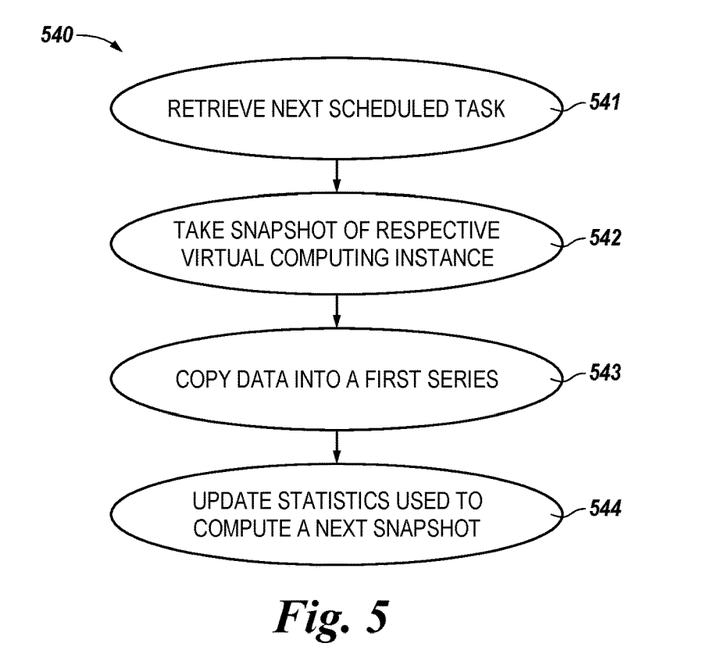
FIG. 5 is a flow chart illustrating a number of methods for scheduling and managing series of snapshots according to embodiments of the present disclosure.

FIG. 5 is a flow chart 540 illustrating a number of methods for scheduling and managing series of snapshots according to embodiments of the present disclosure. In some embodiments, a scheduler (e.g., snapshot scheduling and management system 114, 214 illustrated in FIGS. 1A and 2, replication agent 107-1, 107-N and/or replication agent server 117-1, 117-N illustrated in FIG. 1B) can control copying of snapshots into each series in a cascaded series. In some embodiments, the scheduler can be collocated with a parent series associated with one or more cascaded series. For example, in the case of a cascaded series, that is, if a snapshot is copied from the VCI to a first snapshot series and then into a second snapshot series, the scheduler that can control copying data from the first snapshot series into the second snapshot series can be collocated with the first snapshot series. In some embodiments, each time a snapshot in a parent series of a child series "X" (e.g., first snapshot series) completes, a determination can be made as to whether or not to copy the snapshot or snapshot series to a child series "X," as described in more detail in connection with FIG. 6, herein.

Figure 6:
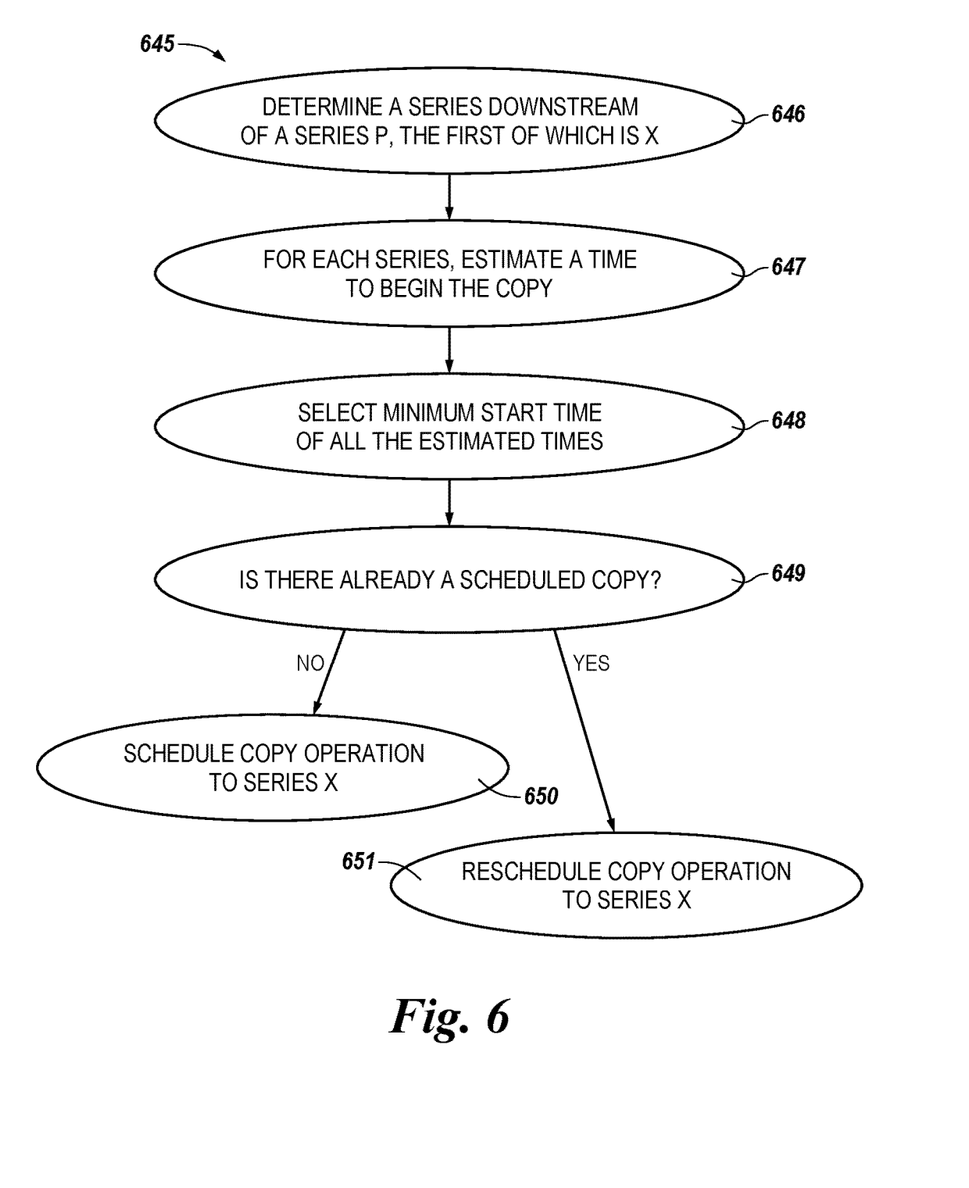
FIG. 6 is a flow chart illustrating a number of methods for scheduling and managing series of snapshots according to embodiments of the present disclosure.

FIG. 6 is a flow chart 645 illustrating a number of methods for scheduling and managing series of snapshots according to embodiments of the present disclosure. In the example illustrated in FIG. 6, a scheduler (e.g., snapshot scheduling and management system 114, 214 illustrated in FIGS. 1A and 2, replication agent 107-1, 107-N and/or replication agent server 117-1, 117-N illustrated in FIG. 1B) can be collocated with the first series of snapshots. After a snapshot is copied into a first series, the scheduler can determine how many subsequent snapshot series exist. In some embodiments this determination can be used to assist in scheduling snapshots to maintain the RPO. For example, in some embodiments, a second snapshot series, a third snapshot series, etc. can be provided and/or generated, and the scheduler can determine how many such series of snapshots are provided and/or generated.

At 646, a series downstream (e.g., a child series) of a series P (e.g., a parent series), the first of which is X can be determined. For example, a second series downstream of a parent series can be determined. In some embodiments, a relationship between these series can be determined. For example, whether the downstream series exhibit a cascaded, fan-out, or other relationship can be determined. In some embodiments, this determination can facilitate scheduling and managing snapshots and snapshot series such that an amount of data lost in the event of a VCI failure is bounded.

At 647, for each series, a time to begin copying a snapshot can be estimated. For example, a time to transfer a snapshot from the first series to the second series can be estimated, a time to transfer a snapshot from the second series to a third series can be estimated, and a time to transfer a snapshot from the first series to a fourth series. Embodiments are not so limited; however, and a time to transfer a snapshot from a first series to a second series and a third series, etc. (e.g., a fan-out relationship), can be estimated. In some embodiments the snapshot can include all changes made to the state of the VCI since a preceding snapshot was transferred. Advantageously, a snapshot including all changes made to the state of a VCI since a preceding snapshot was transferred can facilitate bounding an amount of data lost in the event of a VCI failure. In some embodiments, a schedule time can be estimated to begin copying a most recent snapshot to the second series, and a schedule time can be estimated to begin copying a most recent snapshot to the third series. The estimated schedule time can be based, at least in part, on the estimated times to transfer and/or the RPO.

At 648, the minimum start time of all the estimated times can be selected. For example, if the estimated schedule time for the second series is less than the estimated schedule time for the third series, the schedule time associated with the second series can be selected. In some embodiments, a determination of whether or not a copy operation is scheduled can be made, for example at 649. At 650, if a copy operation is not scheduled, a copy operation can be scheduled. At 651, if a copy operation is scheduled, the copy operation can be rescheduled. In some embodiments, the example method steps illustrated at blocks 649, 650, and 651 can allow for snapshots to be scheduled and managed dynamically in order to maintain the RPO, for example by rescheduling copy operations that are not necessary to maintaining the RPO and/or by scheduling a copy operation within the RPO if a copy operation is not currently scheduled.

In some embodiments, a copy operation can be executed prior to the scheduled time. For example, a copy operation can be scheduled during a time period in which there is not a copy operation associated with a VCI. In some such embodiments, a snapshot in a target series (e.g., series X) can receive additional information prior to the RPO expiring. For example, if the RPO has not expired, the snapshot series can be kept open and additional information can be added to the snapshot series before the RPO expires. Embodiments are not so limited; however, and the snapshot can be closed in response to the copy operation completing. Scheduling and/or copy operations as described herein can be performed for a single VCI or a plurality of VCIs. For example, in some embodiments, scheduling and/or copy operations can be determined across all VCIs in a consistency group (e.g., a plurality of replicated data stores). Moreover, a copy operation from a second series into a third series can begin while a copy operation from a first series to a second series is underway. In some embodiments, such concurrent copy operations can limit an amount of time required to complete the copy operation(s), thereby increasing the feasibility of maintaining the RPO, especially in embodiments with multiple cascaded series.

In some embodiments, snapshots can have different overheads and different recovery guarantees. For example, an application quiesced snapshot can have a higher overhead than a crash consistent snapshot; however, an application quiesced snapshot can provide a better recovery guarantee than a crash consistent snapshot. As used herein, an "application quiesced snapshot" is a snapshot that is taken subsequent to processes running on a VCI being stopped or paused, or after processes running on a VCI are given a chance to flush state to disck and/or make the on-disk state consistent. Advantageously, application quiesced snapshots can include more accurate information regarding the state of the VCI when the snapshot is taken, and/or can include less corrupt data regarding the VCI than non-quiesced snapshot. In some embodiments, this can lead to a more reliable recovery point of the VCI based on the snapshot than a non-quiesced snapshot.

In some embodiments, an application quiesce schedule can be provided to schedule and/or manage application quiesced snapshots in terms of an associated RPO value. For example, an RPO of 30 minutes could be applied to application quiesced snapshots, and a particular snapshot can be quiesced. For example, every fourth snapshot can be an application quiesced snapshot. By quiescing a particular snapshot, as opposed to quiescing every snapshot, benefits associated with quiesced snapshots can be realized while maintaining the RPO via non-quiesced (e.g., crash-consistent) snapshots.

Figure 7:
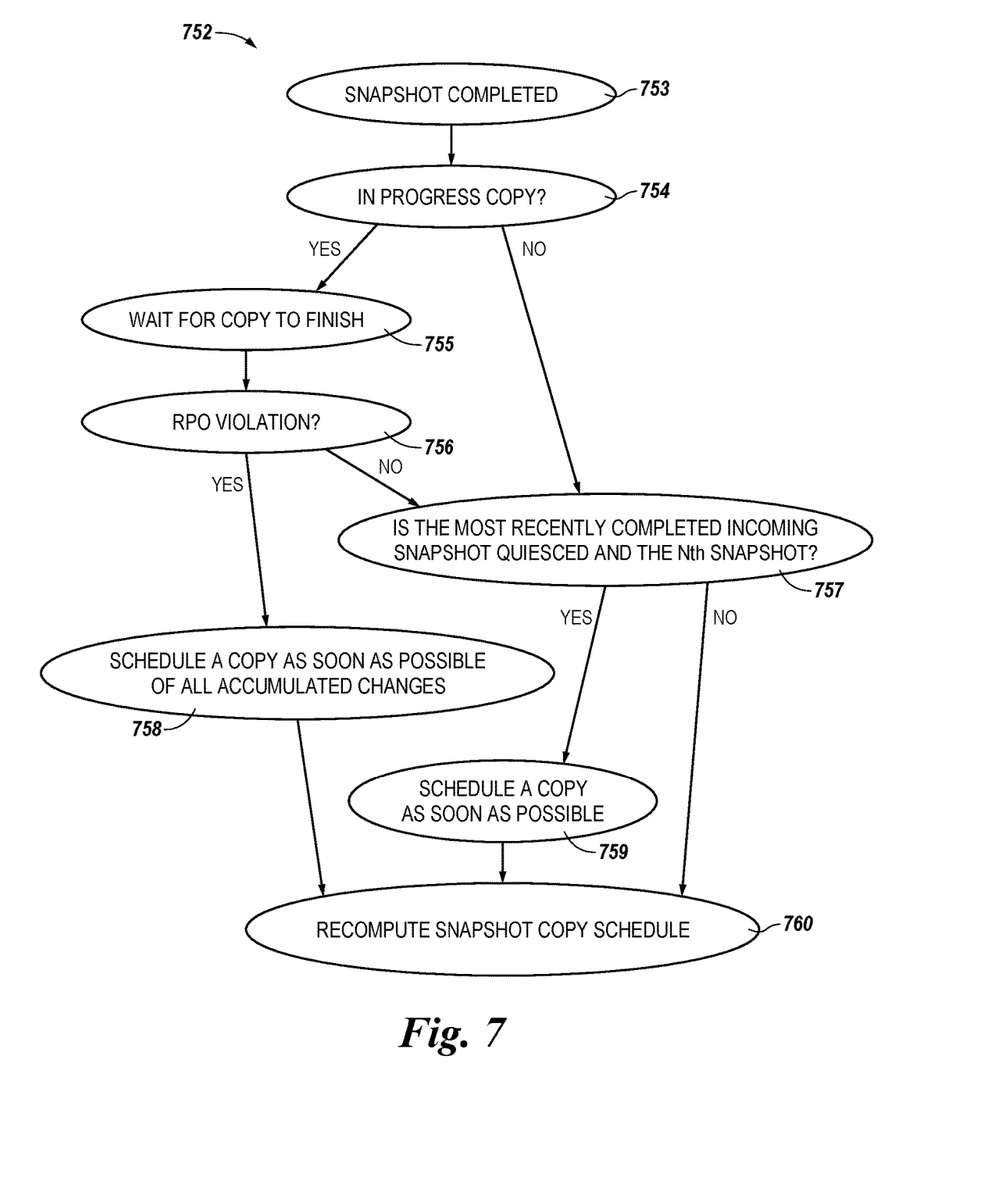
FIG. 7 is a flow chart illustrating a number of methods for scheduling and managing series of snapshots including at least one application quiesced snapshot.

FIG. 7 is a flow chart 752 illustrating a number of methods for scheduling and managing series of snapshots including at least one application quiesced snapshot. At 753, a snapshot can be taken and completed. A determination can be made as to whether or not a copy operation is currently in progress, for example at 754. In some embodiments, for example, at 755, if a copy operation is currently in progress, wait for the copy to finish. That is, in order to avoid copying two snapshots to the same series concurrently, the snapshot with a more recent PIT associated therewith can be held or not copied until the first copy operation is complete. This can assist in minimizing copy operations that could include conflicting information from multiple snapshots taken at different points in time, e.g., snapshots containing conflicting state information regarding a VCI.

In some embodiments, at 756, a determination can be made as to whether or not the RPO will be violated during the copy operation. For example, If a copy operation is not in progress or if there is not an RPO violation, at 757 a determination can be made as to whether or not the most recently completed incoming snapshot is quiesced and/or if the most recently completed snapshot is a particular (e.g., Nth snapshot) in the series, as described above in connection with FIG. 6. If a determination is made that there is an RPO violation, a copy operation can be scheduled as soon as possible, for example, at 758. In some embodiments, the copy operation scheduled as soon as possible can include a snapshot containing accumulated state changes to a VCI since the last copy operation completed.

Figure 8:
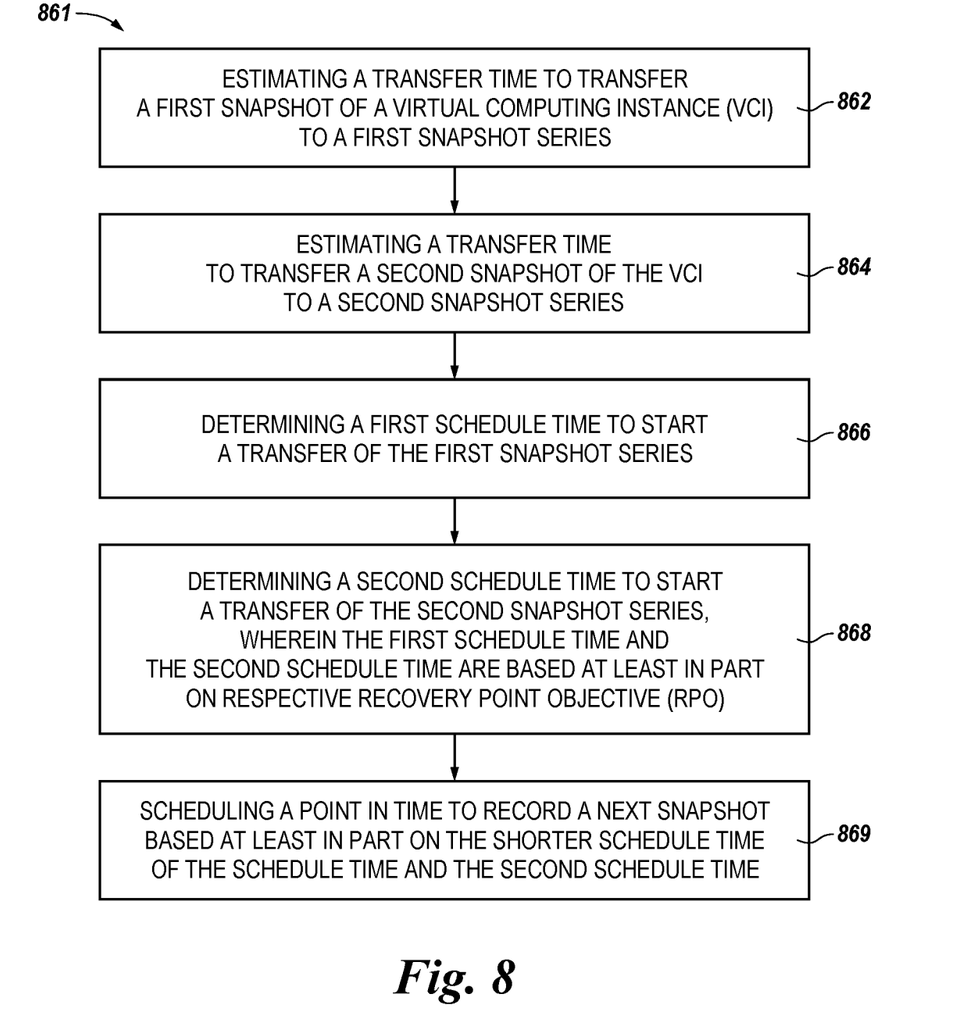
FIG. 8 is a flow chart illustrating a number of methods for scheduling and managing series of snapshots according to a number of embodiments of the present disclosure.

FIG. 8 is a flow chart illustrating a number of methods for scheduling and managing series of snapshots according to a number of embodiments of the present disclosure. At 862, the method can include estimating a transfer time to transfer a first snapshot of a virtual computing instance (VCI) to a first snapshot series. The estimated transfer time can be used to ensure that snapshots are scheduled and managed such that the RPO is not violated.

In some embodiments, the method 861 can include estimating a transfer time to transfer a second snapshot of the VCI to a second snapshot series, for example, at 864. In some embodiments, estimating the transfer time can include estimating the transfer time as described in connection with FIG. 4, herein. At 866, the method can include determining a first schedule time to start a transfer of the first series of snapshots. In some embodiments, determining a first schedule time can include determining the first schedule time as described in connection with FIG. 6, herein.

At 868, the method 861 can include determining a second schedule time to start a transfer of the second series of snapshot, wherein the first schedule time and the second schedule time are based at least in part on a respective recovery point objective (RPO). In some embodiments, for example at 869, the method 861 can include scheduling a point in time to record a next snapshot based at least in part on the shorter schedule time of the first schedule time and the second schedule time.

In some embodiments, the method 861 can include estimating a transfer time to transfer a third snapshot of the VCI to a third snapshot series, determining a third schedule time to start a transfer of the third snapshot series, wherein the first schedule time and the second schedule time are based at least in part on the respective RPO, and scheduling a point in time to record a next snapshot based at least in part on the shorter schedule time of the first schedule time, the second schedule time, and the third schedule time. In some embodiments, estimating the transfer time to transfer the first snapshot and estimating the transfer time to transfer the second snapshot can be based at least in part on an average amount of time taken to transfer two or more previous snapshots. For example, the estimated transfer time for one or more of the snapshots can be determined based on the average amount of time it took to copy the preceding five snapshots.

In some embodiments, the method 861 can include estimating the transfer time to transfer the first snapshot and estimating the transfer time to transfer the second snapshot is based at least in part on a number of snapshots in the first snapshot series. In some embodiments, the number of snapshots in the series can be determined as discussed in connection with FIG. 4, herein.

The method 861 can also include recording the next snapshot based at least in part on the shorter schedule time of the first schedule time and the second schedule time, copying the next snapshot to the first snapshot series in response to the first schedule time being shorter than the second schedule time, and copying the next snapshot to the second snapshot series in response to the second schedule time being shorter than the first schedule time. In at least one embodiment, copying the next snapshot to the first or second snapshot series can include copying the snapshot at a time defined by a difference between current time plus the RPO and the estimated transfer time. In some embodiments, the method 861 can include copying at least part of the next snapshot and at least part of the second snapshot in response to a determination that at least one of the snapshots contains information that at least another one of the snapshots does not contain.

Figure 9:
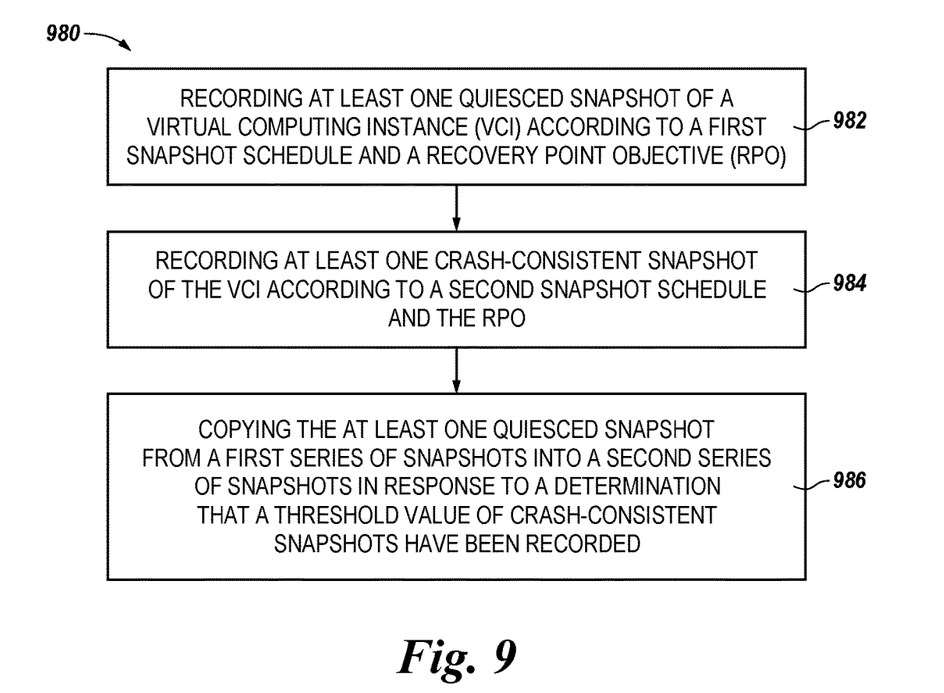
FIG. 9 is a flow chart illustrating a number of methods for scheduling and managing series of snapshots according to a number of embodiments of the present disclosure.

FIG. 9 is a flow chart illustrating a number of methods for scheduling and managing series of snapshots according to a number of embodiments of the present disclosure. At 982, the method 980 can include recording at least one quiesced snapshot of a virtual computing instance (VCI) according to a first snapshot schedule and a recovery point objective (RPO). Recording at least one quiesced snapshot according to the first snapshot schedule and the RPO can ensure that a quiesced snapshot is available to copy while maintaining the RPO.

In some embodiments, the method 980 can include recording at least one crash-consistent snapshot of the VCI according to a second snapshot schedule and the RPO, for example, at 984. As used herein, a "crash-consistent snapshot" is a snapshot that is not quiesced. That is, a crash-consistent snapshot is a snapshot that is taken without stopping or pausing processes running on a VCI. The method 980 can further include copying the at least one quiesced snapshot from a first series of snapshots into a second series of snapshots in response to a determination that a threshold value of crash-consistent snapshots have been recorded, for example, at 986. In some embodiments, at least one of the first snapshot schedule, the second snapshot schedule, and the RPO can be selectable by a user. For example, a user can set or select the RPO for at least one series of snapshots based on a threshold amount of data the user can tolerate losing in the event of a VCI failure. By allowing a user to control the snapshot schedule(s) and/or the RPO, some embodiments can provide for a snapshot can be taken in response to user request to take a snapshot.

In some embodiments, the method 980 can include waiting to copy the at least one quiesced snapshot in response to a determination that a copy operation is in progress and copying the at least one quiesced snapshot immediately in response to a determination that the copy operation is not in progress. The method 980 can further include copying the crash-consistent snapshot from the first series of snapshots into the second series of snapshots in response to a determination that the RPO will be violated if the at least one quiesced snapshot is copied and/or recording the at least one crash-consistent snapshot in response to a determination that the at least one quiesced snapshot cannot be recorded. In some embodiments, the method can include determining that the RPO has been violated, determining that the at least quiesced snapshot has been recorded, and copying the at least one quiesced snapshot in response to the determination that the RPO has been violated.

Figure 10:
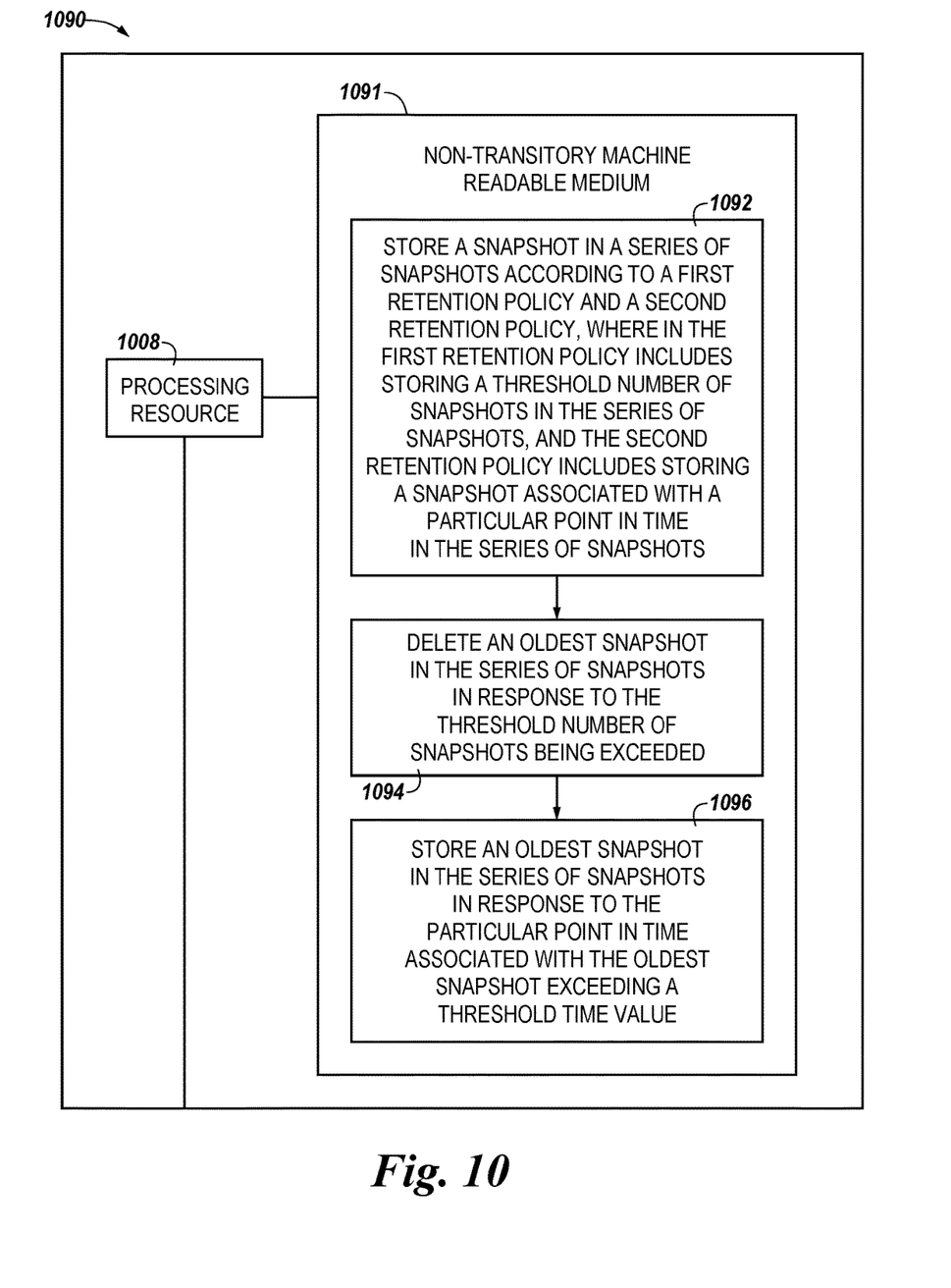
FIG. 10 is an example system including a processing resource and non-transitory computer readable medium for scheduling and managing series of snapshots according to the present disclosure.

FIG. 10 is an example system 1090 including a processing resource 1008 and non-transitory computer readable medium 1091 for scheduling and managing series of snapshots according to the present disclosure. The processing resource 1008 can be configured to execute instructions stored on the non-transitory computer readable medium 1091. For example, the non-transitory computer readable medium 1091 can be any type of volatile or non-volatile memory or storage, such as random access memory (RAM), flash memory, read-only memory (ROM), storage volumes, a hard disk, or a combination thereof. When executed, the instructions can cause the processing resource 1008 to perform scheduling and managing of series of snapshots.

The example medium 1091 can store instructions 1092 executable by the processing resource 1008 to store a snapshot in a series of snapshots according to a first retention policy and a second retention policy, wherein the first retention policy includes storing a threshold number of snapshots in the series of snapshots, and the second retention policy includes storing a snapshot associated with a particular point in time in the series of snapshots.

The example medium 1091 can further store instructions 1094 executable by the processing resource 1008 to delete an oldest snapshot in the series of snapshots in response to the threshold number of snapshots being exceeded. That is, an oldest snapshot can be deleted because a number of snapshots to be stored in the series is exceeded. In some embodiments, the threshold number of snapshots can be selected by a user.

In some embodiments, the example medium 1091 can further store instructions 1096 executable by the processing resource 1008 to store an oldest snapshot in the series of snapshots in response to the particular point in time associated with the oldest snapshot exceeding a threshold time value. For example, an oldest snapshot can be determined to be out of date due to the particular point in time associated with the oldest snapshot exceeding the threshold time value. That is, after a long enough time has transpired, an oldest snapshot may not be current enough in time to recover a relevant state of the VCI.

In some embodiments, the example medium 1091 can further store instructions executable by the processing resource 1008 to predict a probability that a most recent snapshot will be stored based at least in part on the second retention policy. The example medium 1091 can further store instructions executable by the processing resource 1008 to predict the probability that the most recent snapshot will be stored based at least in part on a state flag associated with the most recent snapshot.

In at least one embodiment, a retention policy can include retaining a snapshot among a plurality of snapshots that completes closest to a determined time. For example, a first series can include a plurality of snapshots associated therewith, and a second series can include a plurality of snapshots associated therewith. In some embodiments, a VCI can have a state that corresponds to at least one of the plurality of snapshots associated with the first series and at least one of the plurality of snapshots associated with the second series. That is, a snapshot associated with the first series and having with a particular PIT can correspond to a VCI state that is the same as a VCI state that corresponds to a snapshot associated with second series and having a particular PIT.

As a particular, non-limiting example, a first series can have two snapshots with a different PIT associated therewith, for example, snapshot 1 (e.g., with a PIT of 12:01) and snapshot 2 (e.g., with a PIT of 12:21), and a second series can have two snapshots with a different PIT associated therewith, for example snapshot 3 (e.g., with a PIT of 12:15) and snapshot 4 (e.g., with a PIT of 12:35). As an example, the PIT associated with snapshot 1 can correspond to a VCI state that is the same as the state associated with snapshot 4, which has a different PIT than snapshot 1. In at least one embodiment, a retention policy can favor retaining a snapshot that completes closest to the hour. In this regard, in the preceding example, snapshot 1 will be retained and snapshot 4 will be deleted because snapshot 1 completes closer to the top of the hour than snapshot 4 (12:01 compared to 12:35).

In some embodiments, a flag can be associated with one or more snapshots and/or PIT. In at least one embodiment, the flag can provide an indication that a particular snapshot can be retained. For example, the flag can correspond to a parent series retaining a particular snapshot, and can therefore provide an indication to a child series that the particular snapshot could be retained by the child series as well. In at least one embodiment, the retention policy can include locating the flag and checking the PIT associated with the flagged snapshot and determining whether or not to retain the particular snapshot based at least in part on PIT associated with the particular snapshot.

In some embodiments, the example medium 1091 can further store instructions executable by the processing resource 1008 to store a quiesced snapshot in response to a determination that a crash-consistent snapshot and the quiesced snapshot have been taken. In some embodiments, the example medium 1091 can further store instructions executable by the processing resource 1008 to ignore at least one of the first retention policy and the second retention policy in response to a user input.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1A, and a similar element may be referenced as 214 in FIG. 2. A group or plurality of similar elements or components may generally be referred to herein with a single element number. For example a plurality of reference elements 106-1, 106-2, . . . , 106-N may be referred to generally as 106. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    estimating, based, at least in part on an average amount of time taken to transfer two or more previous snapshots, a transfer time to transfer a first snapshot of a virtual computing instance (VCI) to a first snapshot series;
    estimating, based, at least in part on an average amount of time taken to transfer two or more previous snapshots, a transfer time to transfer a second snapshot of the VCI to a second snapshot series;
    determining a first schedule time to start a transfer of the first snapshot to a first series of snapshots;
    determining a second schedule time to start a transfer the second snapshot to a second series of snapshots, wherein the first schedule time and the second schedule time are based at least in part on a respective recovery point objective (RPO); and
    scheduling a point in time to record a next snapshot based at least in part on the shorter schedule time of the first schedule time and the second schedule time.

2. The method of claim 1, comprising:
    estimating a transfer time to transfer a third snapshot of the VCI to a third snapshot series;
    determining a third schedule time to start a transfer of the third snapshot series, wherein the first schedule time and the second schedule time are based at least in part on the respective RPO; and scheduling a point in time to record a next snapshot based at least in part on the shorter schedule time of the first schedule time, the second schedule time, and the third schedule time.

3. The method of claim 1, wherein estimating the transfer time to transfer the first snapshot and estimating the transfer time to transfer the second snapshot is based at least in part on a number of snapshots in the first snapshot series.

4. The method of claim 1, further comprising:
recording the next snapshot based at least in part on the shorter schedule time of the first schedule time and the second schedule time;
copying the next snapshot to the first snapshot series in response to the first schedule time being shorter than the second schedule time; and
copying the next snapshot to the second snapshot series in response to the second schedule time being shorter than the first schedule time.

5. The method of claim 4, comprising copying at least part of the next snapshot and at least part of the second snapshot in response to a determination that at least one of the snapshots contains information that at least another one of the snapshots does not contain.

6. A system, comprising:
an estimation engine provisioned by hardware resources and configured to:
estimate, based, at least in part on an average amount of time taken to transfer two or more previous snapshots, a transfer time to copy a first snapshot of a virtual computing instance (VCI) into a snapshot series;
estimate, based, at least in part on an average amount of time taken to transfer two or more previous snapshots, a transfer time to copy a second snapshot of the VCI into the snapshot series; and
determine a minimum transfer time to copy the first snapshot or the second snapshot into the snapshot series based on the shorter transfer time of the first transfer time and the second transfer time;
a replication engine provisioned by hardware resources and configured to record at least one of the first snapshot and the second snapshot based on the determination of the minimum transfer time; and
a copy engine provisioned by hardware resources and configured to copy at least one of the first snapshot and the second snapshot into the snapshot series.

7. The system of claim 6, wherein the replication engine is configured to recover a state of the VCI based on at least one of the first snapshot and the second snapshot.

8. The system of claim 6, wherein the replication engine is configured to recover a state of the VCI based on both the first snapshot and the second snapshot.

9. The system of claim 6, wherein the VCI is configured to run on top of at least one of the first series of snapshots and the second series of snapshots.

10. The system of claim 6, comprising a replication schedule engine configured to control copying at least one of the first snapshot and the second snapshot such that the copy occurs at a particular time.

11. The system of claim 10, wherein the replication schedule engine is deployed on a host on which the VCI is running.

12. A method, comprising:
recording at least one quiesced snapshot of a virtual computing instance (VCI) according to a first snapshot schedule and a recovery point objective (RPO);
recording at least one crash-consistent snapshot of the VCI according to a second snapshot schedule and the RPO; and
copying the at least one quiesced snapshot from a first series of snapshots into a second series of snapshots in response to a determination that a threshold value of crash-consistent snapshots have been recorded.

13. The method of claim 12, wherein at least one of the first snapshot schedule, the second snapshot schedule, and the RPO are selectable by a user.

14. The method of claim 12, comprising:
waiting to copy the at least one quiesced snapshot in response to a determination that a copy operation is in progress; and
copying the at least one quiesced snapshot immediately in response to a determination that the copy operation is not in progress.

15. The method of claim 12, comprising copying the crash-consistent snapshot from the first series of snapshots into the second series of snapshots in response to a determination that the RPO will be violated if the at least one quiesced snapshot is copied.

16. The method of claim 12, comprising recording the at least one crash-consistent snapshot in response to a determination that the at least one quiesced snapshot cannot be recorded.

17. The method of claim 12, comprising:
determining that the RPO has been violated;
determining that the at least quiesced snapshot has been recorded; and
copying the at least one quiesced snapshot in response to the determination that the RPO has been violated.

18. A non-transitory machine-readable medium storing instructions executable by a processing resource to cause a computing system to:
store a snapshot in a series of snapshots according to a first retention policy and a second retention policy, wherein the first retention policy includes storing a threshold number of snapshots in the series of snapshots, and the second retention policy includes storing a snapshot associated with a particular point in time in the series of snapshots;
delete an oldest snapshot in the series of snapshots in response to the threshold number of snapshots being exceeded; and
store an oldest snapshot in the series of snapshots in response to the particular point in time associated with the oldest snapshot exceeding a threshold time value.

19. The medium of claim 18, including instructions to predict a probability that a most recent snapshot will be stored based at least in part on the second retention policy.

20. The medium of claim 19, including instructions to predict the probability that the most recent snapshot will be stored based at least in part on a state flag associated with the most recent snapshot.

21. The medium of claim 18, including instructions to store a quiesced snapshot in response to a determination that a crash-consistent snapshot and the quiesced snapshot have been taken.

22. The medium of claim 18, including instructions to ignore at least one of the first retention policy and the second retention policy in response to a user input.

* * * * *